United States Patent [19]

Murray et al.

[11] Patent Number: 4,875,429
[45] Date of Patent: Oct. 24, 1989

[54] BRAKING DEVICE FOR A CAPSULE AT THE END OF A TRAJECTORY

[75] Inventors: Charles N. Murray; Michel R. Jamet, both of Ispra, Italy

[73] Assignee: European Economic Community, Luxembourg, Luxembourg

[21] Appl. No.: 213,200

[22] Filed: Jun. 29, 1988

[30] Foreign Application Priority Data

Jun. 29, 1987 [LU] Luxembourg ............................ 86933

[51] Int. Cl.⁴ ............................................. B63B 35/00
[52] U.S. Cl. ..................................... 114/331; 114/268
[58] Field of Search ............... 114/312, 322, 331, 253, 114/268; 405/185; 441/21, 23, 25

[56] References Cited

U.S. PATENT DOCUMENTS

| | | | |
|---|---|---|---|
| 3,597,778 | 8/1971 | Castelliz | 441/25 |
| 3,641,961 | 2/1972 | Howard | 114/268 |
| 3,699,689 | 10/1972 | Haynes | 61/69 |
| 3,987,741 | 10/1976 | Tryon | 114/322 |
| 4,189,703 | 2/1980 | Bennett | 441/23 |
| 4,686,927 | 8/1987 | Hawkes et al. | 114/331 |

Primary Examiner—Sherman D. Basinger
Assistant Examiner—Stephen P. Avila
Attorney, Agent, or Firm—Sughrue, Mion, Zinn, Macpeak & Seas

[57] ABSTRACT

The invention relates to a submarine braking system of a capsule (4) at the end of fast movement. The capsule glides by gravity along a cable (3) and finally hits in succession several disks (6 to 9) which start to glide and finally hit a hydraulic shock-absorbing system (10). The device procures an efficient but calibrated braking of the of the capsule. The invention has application to the submarine research field.

7 Claims, 1 Drawing Sheet

BRAKING DEVICE FOR A CAPSULE AT THE END OF A TRAJECTORY

FIELD OF THE INVENTION

The invention concerns a submarine braking device for slowing down a capsule at the end of fast movement, this capsule gliding by gravity along a guiding cable which passes through an axial guiding channel of the capsule before hitting said device which is situated at the lower end of this cable.

BACKGROUND OF THE INVENTION

In some submarine research programs, it is desired to make an instrumented capsule descend at very high speed into the deep sea, for example down to 1000 to 2000 m.

When the capsule is fixed on a capstan on board of a ship, the obtained speed is insufficient in view of the fact that the capstan must bear a cable which is 1000 to 2000 m long. The speeds which can thus be realised do not exceed some meters per second. Another solution would be to allow the capsule to fall along a guiding cable by gravity and to provide for braking of the capsule at the end of travel. However, this braking device must be well adjusted for ensuring a controlled deceleration of the capsule, because otherwise the impact transmitted on the cable during an abrupt braking might lead to the rupture of the cable or the destruction of the measuring instruments.

The invention thus aims at presenting a braking device according to the preamble of claim 1, which permits a fine calibration of the capsule deceleration and thus reduces the danger of cable rupture while authorizing a very high descending speed close to that of the free fall.

SUMMARY OF THE INVENTION

According to the invention, this aim is achieved by the fact that the submarine braking device comprises a series of disks which are each fixed coaxially on said cable by individual squeezing means authorizing a gliding of these disks on the cable, if an axial impact threshold is exceeded, and that the end of the cable is attached to a shock-absorbing cylinder which cooperates with a piston fixed to the cable by means similar to the disk squeezing means, the piston penetrates into the cylinder under the impact of the adjacent disk, the wall of the cylinder having a plurality of holes, the diameter of which decreases towards the bottom of the cylinder.

In order to prevent the piston from hitting the bottom of the cylinder, it is useful to provide a spring in this cylinder which on the one end bears against the bottom of the cylinder and may on the other end be applied against the front face of the piston.

In order to increase the reproductibility of the squeezing force of the different squeezing means, it is useful to cover the cable with a plastic layer.

DETAILED DESCRIPTION OF THE INVENTION

The invention will now be described in more detail by means of a preferred embodiment and two figures.

Figure 1:
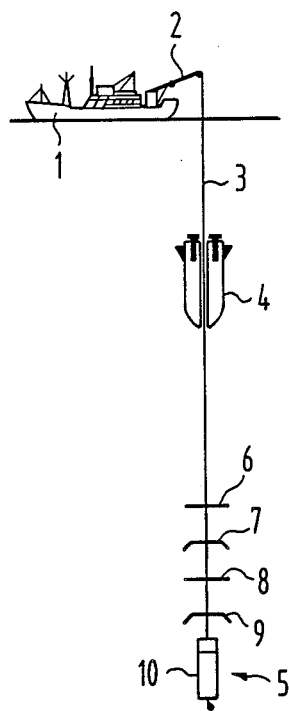
FIG. 1 shows a ship from which a capsule is lowered towards a braking device according to the invention.
Figure 2:
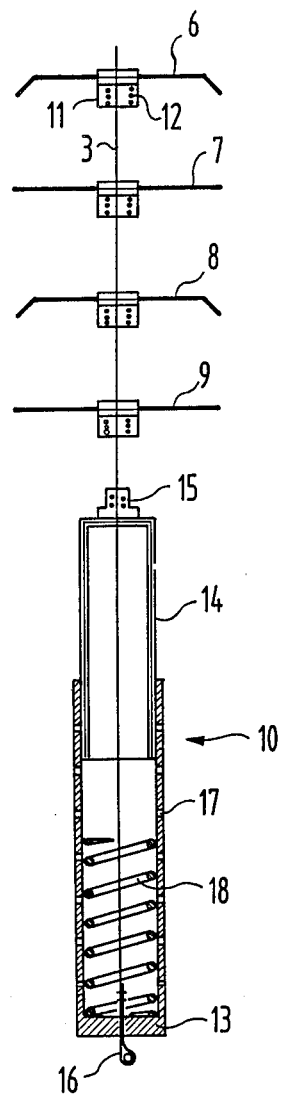
FIG. 2 shows a cut view of the braking device according to the invention.

A research ship 1 carries on an arm 2 a vertical cable 3 which serves as guiding cable for a capsule 4. This capsule comprises for example an instrumentation for the measurement of certain data in deep sea, and it must descend as fast as possible on the cable 3 towards the end 5 of the latter. The length of the cable is for example 2000 m and the capsule has a weight of for example 500 kg in air, and it has a mean density of 2.7 g/cm$^3$. The cable is constituted of 361 steel wires of a non-distorting structure. Its diameter is 14 mm, plus a layer of a thickness of 2.5 mm of plastic material, which covers the steel wires. Such a cable supports a weight of about 15 t, which corresponds to at least twice the tension created by a capsule of 500 kg which ends at above 10 g (g being the terrestrial acceleration).

The device for braking the capsule at the end of travel comprises on the one hand several disks 6, 7, 8, 9 fixed on the cable 3, and on the other hand a hydraulic shock-absorbing system 10. The disks are mounted on the cable at a distance from each other of about 2 m by squeezing means such as 11. These squeezing means comprise two blocks made of PVC or a similar material, which are applied by screws 12 against the cable and which define the position of the corresponding disk in the absence of exterior forces. Nevertheless, if the axial force exerted on a disk passes beyond a limit value adjusted by the screws 12, these blocks and the corresponding disk glide along the cable, this movement further being braked by the water quantity which has to be displaced by the disk.

The disks can be flat disks or disks in the form of an inversed plate for rendering the escape of the water more difficult when a disk glides on the cable. The squeezing force of the PVC blocks on the cable is measured dynamometrically on the screws 12. Its value is chosen experimentally.

The last disk 9 is followed by the shock-absorbing system 10, which is composed of a cylinder 13 and a piston 14. The piston is fixed on the cable by PVC blocks 15 in the same way as the disks, whereas the cylinder is rigidly fixed to the end of the cable 16. The cylindrical wall of the cylinder 13 contains a plurality of holes such as 17, the diameter of which decreases towards the bottom. Inside the cylinder there is a helical spring 18, which applies on the one end against the bottom of the cylinder 13 and which, on the other end, can come into contact with the front face of the piston 14.

The device according to the invention works as follows:

When a capsule 4 hits the first disk 6 after a free fall along the cable 3, the impact exerted by the capsule on this disk exceeds substantially that fixed by the corresponding squeezing means. Consequently, this disk 6 starts gliding on the cable and braking the capsule 4 as a function of the friction between the cable and the squeezing means and the inertia of the water below this disk. As soon as the first disk hits the second disk 7, the friction in the squeezing means of this disk is added to the preceding braking forces. The speed of the capsule diminishes and the friction force further increases, when the third disk 8 starts to glide, and so on, up to the last disk 9, which finally hits the squeezing means 15 of the piston 14. At this instant, the piston 14 begins to penetrate into the cylinder 13 and pushes the water through the holes 17 out of the cylinder. As the piston advances, the number of holes through which the water is pushed outside is reduced, whereby the force which is antagonistic to the inertia of the capsule is increased. This force is further increased by the force of the spring 18 as soon as the piston abuts against this spring.

It is apparent that by means of an adequate squeezing of the squeezing means on the disks and the piston, by a convenient choice of the diameter and the disposition of the holes in the cylinder 13, as well as by a convenient choice of the characteristic of the spring 18, the braking force can be calibrated in accordance with the advance movement of the capsule in such a way that the capsule is stopped without ever exerting an excessive impact on the cable, force which might damage the cable, its suspension or the instrumentation installed in the capsule 4.

A particularly interesting application of the device according to the invention is found in the simulation of a penetration of a capsule into the sediments on the sea floor. Before making an instrumented capsule penetrate into the sea floor sediments, one must be sure that the decelerations to which the capsule is submitted during the penetration into the sediments do not create impacts which would impair the later operation of the instruments (batteries, detectors, ultrasonar signal emitters). By means of the device according to the invention, which is conveniently adjusted, such tests can be carried out in such a way that they simulate the effects of the penetration of a capsule into the submarine sediments after its free fall in the water. After a fall test, not only the capsule can be retrieved and its possible faults be analyzed by remounting the cable 3 on a ship 1, but also the displacement of the different disks on the cable can be measured and possibly the squeezing force of the disks on the cable can be readjusted.

We claim:

1. A submarine braking device for slowing down a capsule at the end of fast movement, this capsule gliding by gravity along a guiding cable which passes through an axial guiding channel of the capsule before hitting said device which is situated at the lower end of this cable, characterized by the fact that it comprises a series of disks (6 to 9) which are each fixed coaxially on said cable (3) by individual squeezing means (11, 12) authorizing a gliding of these disks on the cable, if an axial impact threshold is exceeded, and that the end of the cable (16) is attached to a shock-absorbing cylinder (13) which cooperates with a piston (14) fixed to the cable by means (15) similar to the disk squeezing means, so that the piston penetrates into the cylinder under the impact of the adjacent disk (8), the wall of the cylinder (13) having a plurality of holes (17), the diameter of which decreases towards the bottom of the cylinder.

2. A device according to claim 1, characterized in that the shock-absorbing cylinder (13) comprises a spring (18) which on the one hand bears against the bottom of the cylinder (13) and may on the other hand be applied against the front face of the piston (14).

3. A device according to claim 1, characterized in that the cable is covered with a plastic layer.

4. A device according to claim 1, characterized in that the individual squeezing means comprise two blocks (11) made of PVC which are assembled by screws (12) around the cable.

5. A device according to claim 2, characterized in that the cable is covered with a plastic layer.

6. A device according to claim 2, characterized in that the individual squeezing means comprise two blocks (11) made of PVC which are assembled by screws (12) around the cable.

7. A device according to claim 3, characterized in that the individual squeezing means comprise two blocks (11) made of PVC which are assembled by screws (12) around the cable.

* * * * *